United States Patent [19]

Lesley

[11] Patent Number: 5,358,198
[45] Date of Patent: Oct. 25, 1994

[54] TEREMP FABRIC

[75] Inventor: Bascum G. Lesley, Pickens, S.C.

[73] Assignee: Milliken Research Corporation, Spartanburg, S.C.

[21] Appl. No.: 136,400

[22] Filed: Oct. 15, 1993

Related U.S. Application Data

[63] Continuation of Ser. No. 908,349, Jul. 6, 1992, abandoned.

[51] Int. Cl.⁵ .................. G03B 17/26; D04B 21/00
[52] U.S. Cl. ................... 242/348.4; 354/275; 66/192
[58] Field of Search ............... 242/71.1, 71.7; 354/275, 277; 66/193, 192, 195

[56] References Cited

U.S. PATENT DOCUMENTS

| 4,607 | 6/1846 | Glover | 66/195 |
|---|---|---|---|
| 1,201,803 | 10/1916 | Chace | 66/195 |
| 2,104,538 | 1/1938 | Goldsmith | 66/195 |
| 2,339,658 | 1/1944 | Smith . | |
| 2,696,723 | 12/1954 | Frith, Jr. | 66/192 |
| 3,475,926 | 11/1969 | Ruckstuhl | 66/195 |
| 3,494,150 | 2/1970 | Grau | 66/195 |
| 3,552,152 | 1/1971 | Koppenburg | 66/195 |
| 4,003,224 | 1/1977 | Odham | 66/193 |
| 4,067,210 | 1/1978 | Arons et al. | 66/192 X |
| 4,568,590 | 2/1986 | Iwai | 354/275 |
| 4,624,116 | 11/1986 | Rogers | 66/193 |
| 4,730,778 | 3/1988 | Akao et al. | 242/71.1 |

*Primary Examiner*—John M. Jillions
*Attorney, Agent, or Firm*—Terry T. Moyer; Earle R. Marden

[57] ABSTRACT

A container for a light-sensitive strip material having a warp knit, weft inserted fabric provided in the opening thereof to prevent access of light to the light-sensitive material in the container. The warp knit, weft inserted fabric is dyed, dried, napped, sheared and heat set prior to mounting in the opening thereof.

7 Claims, 3 Drawing Sheets

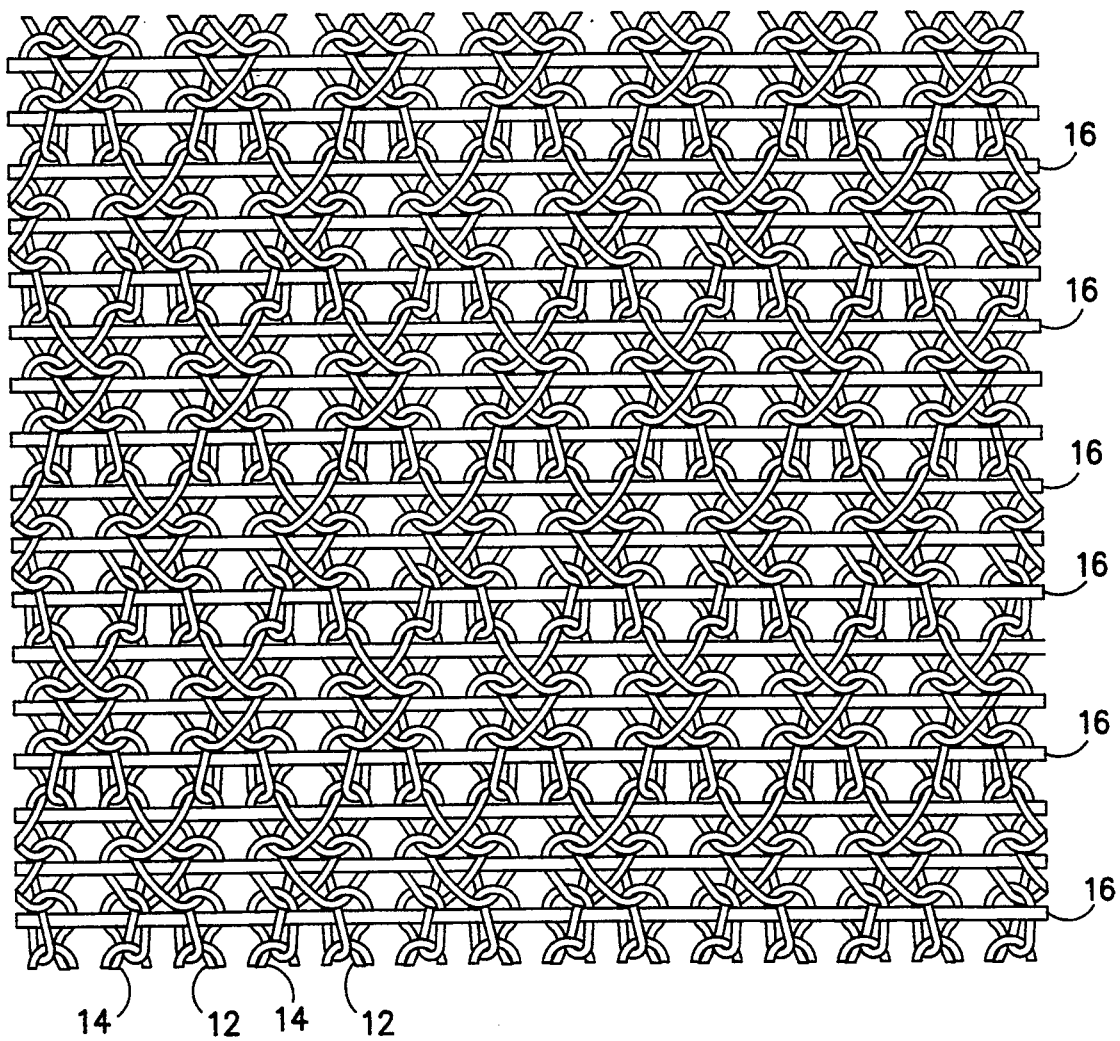
FIG. -1-
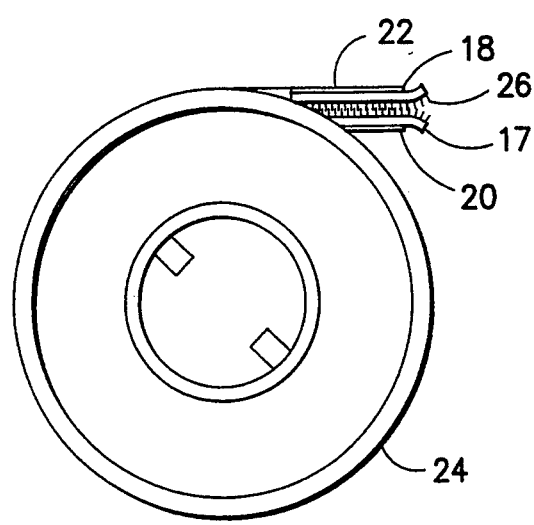
FIG. -2-

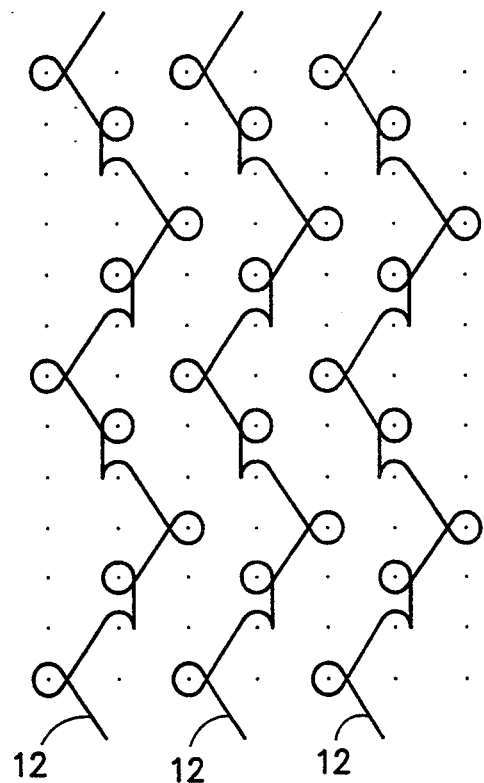
FIG. —3—
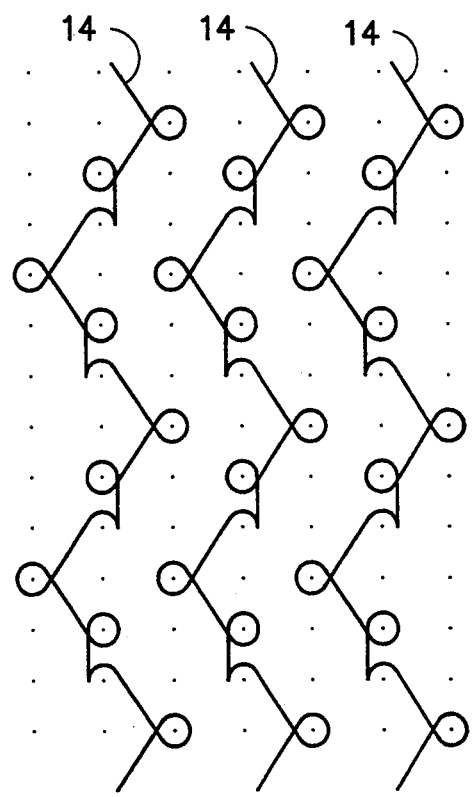
FIG. —4—

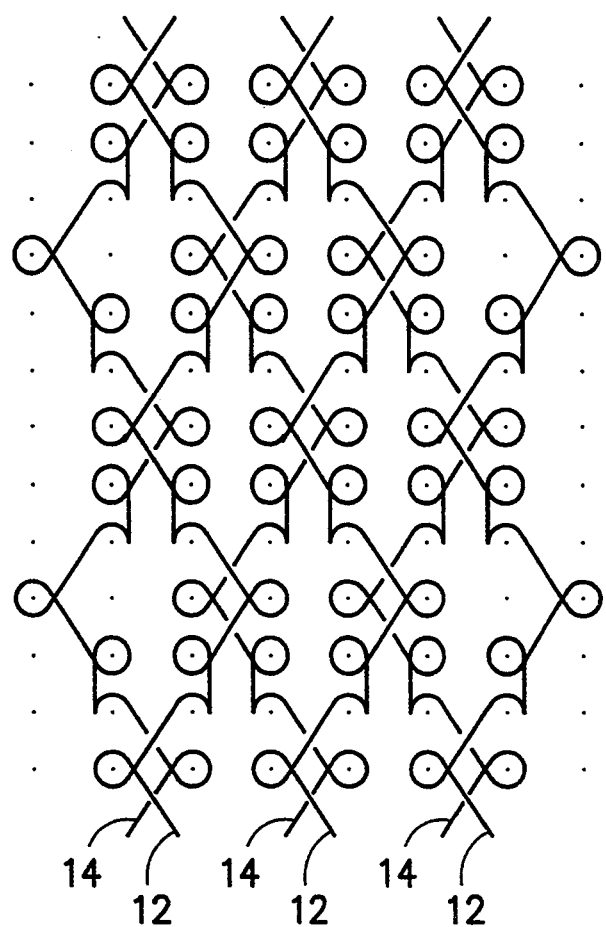
FIG. -5-

TEREMP FABRIC

This is a continuation of application Ser. No. 07/908,349 filed Jul. 6, 1992 now abandoned, for TEREMP FABRIC.

This invention relates to a film container having a teremp cloth bonded to the film withdrawing outlet.

Film containers, especially photographic film containers, are classified into two groups, i.e., cassettes for sheet films and cartridges for roll films. Each of the film containers has a light shielding member at its opening (outlet) through which the film is withdrawn in order to prevent the film from being prematurely exposed by light in the container. The light shielding member which is made of cloth is called a teremp cloth.

The teremp cloth is black so as to sufficiently protect the photographic film from unwanted exposure. In addition, the teremp cloth should be flexible so that the film wall not be scratched or damaged when it is withdrawn or rewound.

An object of the present invention is to provide a film container having a teremp cloth which is manufactured at low cost by a relatively simple method, and a teremp cloth which is free from the problems in which yarns come loose or become frayed.

The foregoing object of the present invention has been achieved by the provision of a film container which, according to the present invention, comprises a teremp cloth having a knitted structure, which is bonded to the film withdrawing outlet of the film container.

Other objects and advantages of the invention will become readily apparent as the specification proceeds to describe the invention with reference to the accompanying drawings, in which:

FIG. 1 is a schematic view of the new and improved teremp cloth;

FIG. 2 is a partially sectional view showing the new teremp cloth mounted in the outlet of a conventional film cartridge pack; and FIGS. 3–5 schematically represent the bar movement of a warp knit knitting machine to produce teremp fabric of FIGS. 1 and 2.

Looking now to FIG. 1 there is represented a two bar warp knit fabric 10 having a first warp yarn 12 knit on bar 1 of the knitting machine, a second warp yarn 14 on bar 2 of the knitting machine and a weft inserted yarn 16. The fabric 10 after being knit is then successively, in wide widths off the knitting machine, dyed, dried, napped, sheared and heat set to produce the desired teremp cloth 17. After heat setting the fabric is cut to the desired size and attached by suitable means to the inner faces 18 and 20 of the opening 22 of the light sensitive material container 24. The pile fibers 26 are raised by napping and shearing of the fabric 10 provide the light blocking material in the opening 22 of the container 24.

In the preferred form of the agreement the warp knit, weft inserted fabric is knit on a Raschel warp knitting machine using two bars. As indicated in FIG. 3, bar 1 is knitting 2-3, 2-1, 1-2, 1-0, 1-2, 2-1 and as, shown in FIG. 4, bar 2 is knitting 1-0, 1-2, 2-1, 2-3, 2-1, 1-2 to form the fabric shown in FIG. 5. Since the weft yarn 16 is being inserted while bars 1 and 2 are knitting as described above the resultant fabric is as shown in FIG. 1 to perform the function shown in FIG. 2 after it has been napped and sheared.

The preferred warp yarn is a 40 denier, 27 filament polyester yarn and a number of weft yarns can be employed, if desired. The preferred weft yarns are either a 4 ply, 100 denier, 100 filament polyester yarn or a 20/2 (cotton count) spun staple polyester yarn. Other yarns can be employed but these two appear to perform the best as a teremp fabric after they have been napped and sheared.

In the present invention, the teremp cloth having a weft inserted warp knitted structure is used. Accordingly, no waste pile yarns are created during the manufacture of the teremp cloth, and no yarns come loose from the teremp cloth when the latter is brought into contact with the film at the film withdrawing outlet of the film cartridge. The knitting speed is several times as fast as the weaving speed in the manufacture of a teremp cloth, and it is unnecessary to use an adhesive in the knitted teremp cloth. Thus, the film cartridge with a teremp cloth according to the present invention can be manufactured at considerably lower cost as compared to a film cartridge using a conventional teremp cloth.

Although the preferred embodiment of the invention has been described it is understood that variations thereof can be made within the scope of the invention and it is therefore desired that the invention be limited only by the scope of the claims.

I claim:

1. A container for a roll of light-sensitive strip material provided with an opening for drawing out said light-sensitive strip material from said container, light shielding fabric being provided in said opening, the light shielding fabric comprising a two-bar warp knit, weft inserted having fibers napped from the surface thereof to prevent light from entering the opening in said container, the knit construction of said fabric being formed by the first bar knitting with a movement of 2-3, 2-1, 1-2, 1-0, 1-2, 2-1 while the second bar is knitting with a movement of 1-0, 1-2, 2-1, 2-3, 2-1, 1-2.

2. The container of claim 1 wherein all of the yarns of the light shielding fabric are substantially 100% polyester and the weft yarn is a spun, staple yarn.

3. A container for a roll of light-sensitive strip material provided with an opening for drawing out said light-sensitive strip material from said container, light shielding fabric being provided in said opening, said light shielding fabric comprising a substantially 100% polyester two bar warp knit, weft inserted fabric with the weft inserted yarn being spun, staple yarn and napped and sheared to raise fibers therefrom to prevent light from entering the opening in said container, the light shielding fabric has a construction formed by the first bar knitting 2-3, 2-1, 1-2, 1-0, 1-2, 2-1 and the second bar knitting 1-0, 1-2, 2-1, 2-3, 2-1, 1-2.

4. A container for a roll of light-sensitive strip material provided with an opening for drawing out said light-sensitive strip material from said container, light shielding fabric being provided in said opening, said light shielding fabric comprising a warp knit, weft inserted fabric with the weft inserted yarn being napped to raise fibers therefrom to prevent light from entering the opening in said container.

5. The container of claim 4 wherein all of the yarns of the light shielding fabric are substantially 100% polyester and the weft yarn is a spun, staple yarn.

6. The container of claim 5 wherein the light shielding fabric is napped and sheared.

7. The container of claim 6 wherein the light shielding fabric is napped and sheared.

* * * * *